United States Patent
Götze et al.

(10) Patent No.: US 7,788,419 B2
(45) Date of Patent: Aug. 31, 2010

(54) METHOD FOR INSTALLING AN AUXILIARY UNIT ON A COMPUTER

(75) Inventors: Frank Götze, München (DE); Bernd Haas, Neustift (AT); Denny Brandl, Eching (DE); Boris Birman, Landshut (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 12/086,776

(22) PCT Filed: Dec. 22, 2006

(86) PCT No.: PCT/EP2006/012495
§ 371 (c)(1),
(2), (4) Date: Sep. 25, 2008

(87) PCT Pub. No.: WO2007/076984
PCT Pub. Date: Jul. 12, 2007

(65) Prior Publication Data
US 2009/0193154 A1 Jul. 30, 2009

(30) Foreign Application Priority Data
Dec. 22, 2005 (DE) .......................... 10 2005 061 662

(51) Int. Cl.
*G06F 3/00* (2006.01)
*G06F 13/20* (2006.01)
(52) U.S. Cl. .............................. 710/8; 710/15; 710/313; 719/327
(58) Field of Classification Search ............... 710/8–10, 710/15–19, 305–313; 719/327
See application file for complete search history.

(56) References Cited

U.S. PATENT DOCUMENTS

| 7,555,602 | B2 * | 6/2009 | Utsumi | 711/115 |
|---|---|---|---|---|
| 2003/0023770 | A1 | 1/2003 | Barmettler et al. | |
| 2004/0230710 | A1 | 11/2004 | Goodman | |
| 2005/0188381 | A1 * | 8/2005 | Mitekura et al. | 719/321 |
| 2006/0031623 | A1 * | 2/2006 | Bando | 710/313 |

(Continued)

FOREIGN PATENT DOCUMENTS

EP 1 280 059 A2 1/2003

(Continued)

*Primary Examiner*—Christopher B Shin
(74) *Attorney, Agent, or Firm*—Bacon & Thomas, PLLC

(57) ABSTRACT

A method is proposed for automatically installing an auxiliary unit (30) on a computer (10) that is not yet prepared for the auxiliary unit (30). Upon connecting a new auxiliary unit (30) to the computer a registration routine (18) is carried out, within which operating routines (24) required for operating the auxiliary unit (30) are installed, after whose installation the auxiliary unit (30) is switchable from a basic mode to an auxiliary-unit specific operation mode. If the operating routines (24) are not yet present in the computer (10), they are first transmitted to it by the auxiliary unit (30). According to the invention it is determined whether a required operating routine (24) has to be transmitted by installing a background process (20) on the computer (10) which, upon the connection of an auxiliary unit (30), checks whether identification information (50) re-transmitted to the computer (10) upon request is already stored on the computer (10).

14 Claims, 6 Drawing Sheets

U.S. PATENT DOCUMENTS

| | | | |
|---|---|---|---|
| 2006/0161617 A1* | 7/2006 | Zhong et al. | 709/203 |
| 2007/0043903 A1* | 2/2007 | Utsumi | 711/115 |
| 2007/0168563 A1* | 7/2007 | Jha et al. | 709/250 |
| 2008/0065898 A1* | 3/2008 | Greco et al. | 713/185 |

FOREIGN PATENT DOCUMENTS

| | | |
|---|---|---|
| WO | WO 03/012577 A3 | 2/2003 |
| WO | WO 2004/008313 A1 | 1/2004 |

\* cited by examiner

METHOD FOR INSTALLING AN AUXILIARY UNIT ON A COMPUTER

BACKGROUND OF THE INVENTION

The invention starts out from a method according to the preamble of the main claim. Such a method is known from WO 03/012577 A3. There a method is described for automatically installing a function unit on a host computer equipped to recognize certain mass memory units. According to the method the function unit to be installed first registers with the host computer as a standard mass memory. For this purpose it is provided with an emulator that can be switched off and which is switched on in the initially preset basic mode. After registering as a mass memory the function unit induces the host computer to communicate a data sequence containing information about whether the drivers and configuration means corresponding to the function unit are present on the host computer. If this is not the case, the function unit further induces the host computer to provide it with information about the operating system installed on the host computer. In accordance with the thus determined operating system the function unit selects suitable drivers and configuration means among several such drivers and configuration means stored on the function unit and transmits them to the host computer. After installing the transmitted drivers and configuration means the function unit is switched to a function-unit specific operating mode and the installation is concluded.

The known method permits the installation of a function unit on a host computer which is not prepared for the function unit at first and does not have the drivers and configuration means required for operating the function unit. However, it implies that the function unit acts at least partly as an active component towards the host computer during the installation phase. Therefore the method is not suitable for arrangements designed strictly according to the "master-slave principle", in which the host computer acts exclusively as master. The transmission of information about the host computer to the function unit for the purpose of selecting the drivers is furthermore difficult to implement. Such a transmission can be simulated by a user by simulating manual input. However, this bears the risk that errors occur in user inputs during the installation phase.

From WO 2004/008313 A1 a method is known for establishing cooperation between a host computer and a function unit carrying out a sub-function within the framework of an application run on the host computer. In order to introduce the sub-functions provided on the function unit to the host computer, the function unit first registers in a first configuration as a standard mass memory and transmits information about supported standard applications to the host computer. One of the standard applications is designed to determine the further sub-functions provided on the function unit. Furthermore, the host computer communicates the operating system used to the function unit. On the basis of the information the function unit determines the sub-functions to be activated for the possible applications and the operating routines required on the host computer for the execution thereof. Subsequently the function unit is restarted. It now registers with the host computer with an enhanced, second configuration comprising the standard functions and in addition the now activated sub-functions. Furthermore the required operating routines are transmitted to the host computer. The auxiliary unit is switched from the first to the second configuration with the aid of a flag. A fast implementation of the method, in particular, as proposed, for USB smart cards, conflicts with the fact that the proposed determination of the available sub-functions by a standard application and likewise the communication of the operating system used cannot be reconciled easily with the USB standard. Moreover, registering the auxiliary unit in a composite configuration bears the risk that a host computer accepts only the first formally indicated one.

SUMMARY OF THE INVENTION

It is the object of the invention to provide a method for autonomously installing an auxiliary unit on a host computer that can be employed in arrangements working consistently in accordance with the master-slave principle.

This problem is solved by a method having the features of the main claim. The inventive method permits the autonomous installation of an auxiliary unit on a host computer not yet prepared for this, without the host computer having to transmit data to the auxiliary unit. In particular the method does not require any simulation of manual input by a user. It is a particular advantage of the method that a once installed background process subsequently permits a faster installation of a plurality of different auxiliary units. The method can be installed advantageously on any desired host computer, without the necessity of any changes to the hardware or the software.

The inventive method is particularly suitable for auxiliary units with USB interface.

BRIEF DESCRIPTION OF THE DRAWINGS

An embodiment of the invention will hereinafter be explained in more detail with reference to the drawing.

In the drawings.

DETAILED DESCRIPTION OF THE PREFERRED EMBODIMENTS

Figure 1:
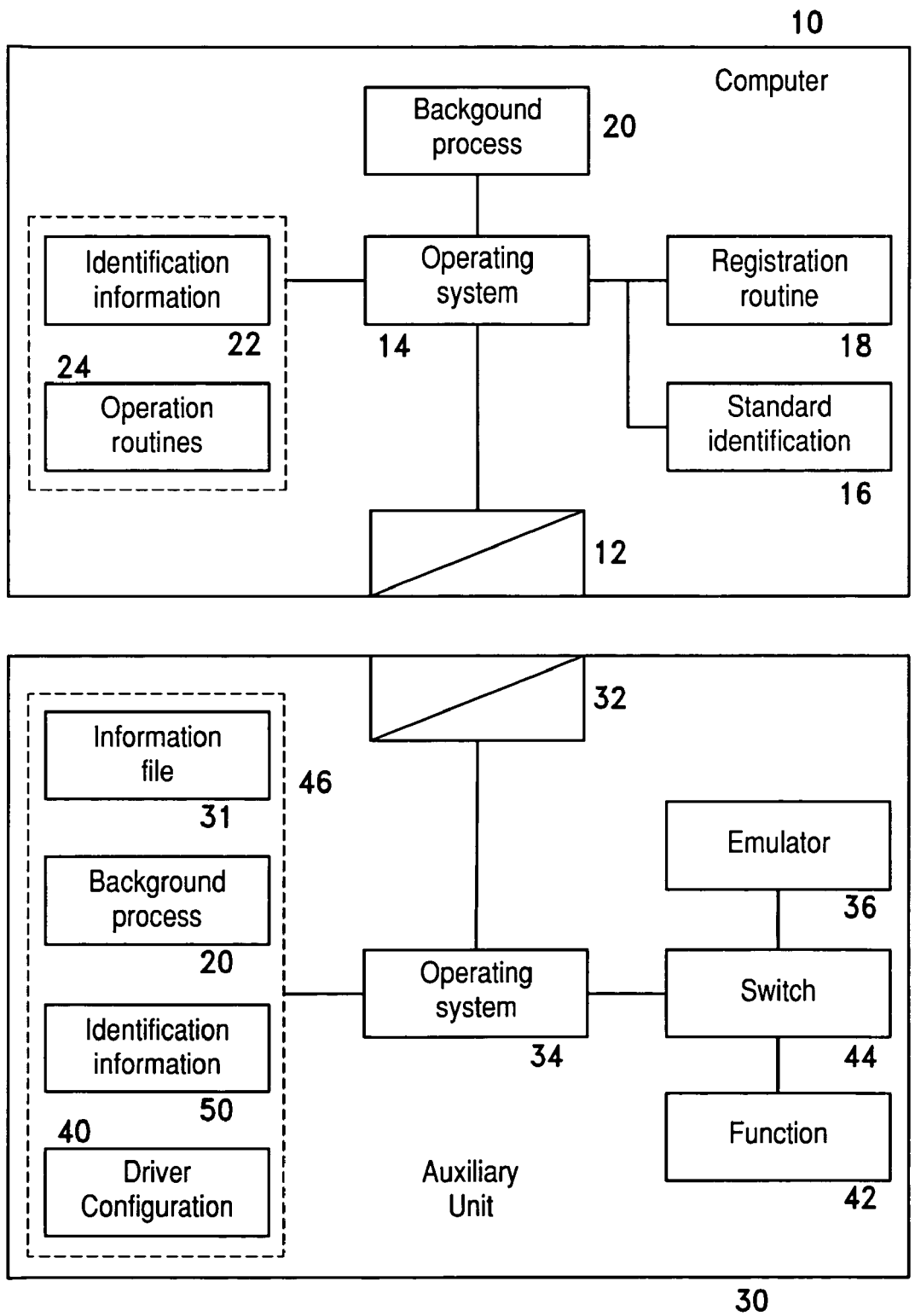
FIG. 1 shows the structure of an arrangement of host computer and auxiliary unit.

FIG. 1 shows an arrangement with a host computer 10 and an auxiliary unit 30 with the elements of their internal structure that are respectively relevant for the present invention.

The host computer 10, hereinafter referred to simply as computer, is a conventional data processing apparatus with a central processing unit, several memories, a man-machine-interface and at least one interface 12 for connecting an auxiliary unit 30. The computer 10 can practically be a privately used PC, a publicly accessible terminal, such as a bank terminal or a terminal of a computer network. The running of the computer 10 ins controlled by an operating system 14 which is equipped with a standard identification 16 to automatically identify auxiliary units 30 newly connected to the interface 12. Part of the operating system 14 is a registration routine 18 that triggers the execution of certain launch program routines upon detecting the connection of a new auxiliary unit 30 to the interface 12. To the operating system 14 are allocated furthermore a background process 20, a list 22 with known auxiliary-unit identifications and a memory 24 with operating routines, auxiliary-unit specific drivers and configuration settings required for operating the auxiliary unit. The operating routines in the memory 24 correspond to the identifications stored in the list 22, as indicated by the edge line. The elements 20, 22, 24 and their execution, respectively, form together the core of a launch routine suitable particularly for launching auxiliary units 30 which cannot be launched by the standard identification 16. All mentioned logical elements of the computer 10 are implemented in a usual manner in the hardware and software structures of the computer 10. The logical distinction made here merely for the sake of supporting the description does not necessarily have to be reflected by the practical implementation.

The auxiliary unit 30 typically is a computer limited in resources with a microcontroller, memory means and possibly operating elements, and has for example the shape of a chip card or a USB token. The auxiliary unit 30 can be operated in two operating modes, a basic mode and an auxiliary-unit specific operating mode. In the auxiliary-unit specific operating mode it provides the computer 10 with a specific functionality 42 which as a rule is not present on the computer 10. The auxiliary unit 30 runs controlled by an auxiliary-unit specific operating system 14 that is connected to a mode switch 44, serving to switch between the two operating modes, and the interface 32. For implementing the basic mode the mode switch 44 is connected to an emulator 36 serving to register the auxiliary unit 30 with a computer 10 as a device of a predetermined type. In a memory area 46 a background process 20, drivers and configuration settings 40 for operating the auxiliary unit 30 and identification information 50 are stored. All logical elements mentioned are implemented in the hardware structure of the auxiliary unit 30 or are stored as software modules on the auxiliary unit 30 in conventional fashion. The logical distinction made here merely for the sake of supporting the description does not necessarily have to be reflected by the hardware implementation.

The computer 10 and the auxiliary unit 30 cooperate according to the "master-slave" principle, wherein the computer 10 acts as master and the auxiliary unit 30 acts as slave. According to this master-slave principle the computer 10 sends commands to the auxiliary unit 30, to which the latter responds.

The operating system 14 of the computer 10 is of a conventional type. In particular it can be the quasi standard operating system WINDOWS® by the company MICROSOFT. The interface 12 can for example be a USB interface, a FIREWIRE® interface or any desired other standardized interface. The standard identification 16 is a basic function of the computer 10 which permits to launch auxiliary units 30 of certain standard types that are newly connected to the interface 12, and to integrate them in the operation of the computer 10. Upon detecting the connection of a new auxiliary unit 30 the standard identification 16 induces the operating system 14 to execute the registration routine 18, which is preferably executed automatically and has the effect that the auxiliary unit 30 is launched automatically. The concept is known i. a. as "plug and play" and is frequently implemented e. g. on PCs with a USB interface, which directly identify and launch USB units newly connected to the PC. The identification routine 18 is also of the conventional type. Under WINDOWS it is e. g. known as "autorun" routine. It induces the operating system 14 upon receipt of a corresponding control signal to execute certain, predetermined program routines for launching a new hardware unit; under WINDOWS e. g. typically an executable program is started.

The background process 20 is a program routine running automatically and continuously in the background, which does not require any user input and does not allocate any resources. If provided, the background process 20 is started upon starting the computer 10. The function of the background process 20 is to identify auxiliary units 30 newly connected to the interface 12 and to trigger their launch. The background process 20 is not auxiliary-unit specific. It reacts to event signals emitted by the operating system 14 and permits the identification of different auxiliary units 30.

In the list 22 identifications 50 of auxiliary units 30 are stored, which units are currently connected to the computer 10 or were connected to the computer 10 at earlier points in time. Under WINDOWS the identifications 50 can have the form of drive names (volume IDs), which were communicated by the auxiliary units 30 themselves, after having first been assigned a drive character by the standard identification 16 of the operating system 14.

In the memory 24 operating routines are stored which correspond to the identifications 50 in the list 22 and which are required for operating the auxiliary units 30. The operating routines comprise in particular drivers, configuration settings as well as similar routines for the individual auxiliary units 30.

The list 22 and the memory 24 are as a rule empty or are not provided as long as no background process 20 exists on the computer 10.

The auxiliary unit 30 has a stand-alone operating system 34 which implements at least one functionality 42 that is specific for the auxiliary unit 30. The auxiliary unit 30 can for example be a chip card with the functionality of a mini web server, which is contacted via the USB interface, using a TCP/IP protocol.

The emulator 36 serves to register the newly connected auxiliary unit 30 with the computer 10 initially pretending that it is a standard unit, which can be launched by the standard identification 16 provided in the computer. Towards a computer 10 with the operating system WINDOWS the emulator 36 can pretend that an auxiliary unit 30 is for example a "memory stick" or generally a standard mass memory unit.

In the memory area 46 of the auxiliary unit 30 a background process 20 is stored, which after transmission to a computer 10 prepares the latter to recognize auxiliary units 30 in the future and to provide or load the operating routines required for operating an auxiliary unit 30, i.e. the corresponding drivers and configuration settings. The background process 20 stored in the memory 48 is adapted to the operating system 14 of computers 10 to which the auxiliary unit 30 can be connected. Expediently, it is stored identically in all auxiliary units 30 that are connectable to computers 10 with an operating system 14 of the same type.

In the memory area 46 of the auxiliary unit 30 furthermore an information file 31 is present, which is by default accessed first by a registration routine 18 or the operating system 14 of a computer 10 upon connecting the auxiliary unit 30 to a computer 10. If the auxiliary unit 30 is adapted to a WINDOWS operating system, the information file 31 is for example the file "autorun.inf". The information file 31 contains an installation program which can be executed by a computer 10 after transmission thereto, in order to effect the transmission and installation of data, in particular of the background process and the operating routines, for preparing the computer 10 for an auxiliary unit 30.

In the memory 46 drivers and configuration settings 40 are stored, which are required for the further operation of the auxiliary unit 30 via the computer 10, and which are intended for transmission to a computer 10. The drivers and configuration settings stored in the memory 40 are specific for the type of auxiliary unit 30.

The memory 50 further contains identification information (volume ID) which is specific for the auxiliary unit 30, and which is, upon its request, transmitted to the computer 10. Furthermore the memory 50 expediently contains basic information on the exact designation of the auxiliary unit 30, on the technical properties as well as routing information for executing the registration routine 18.

Figure 2:
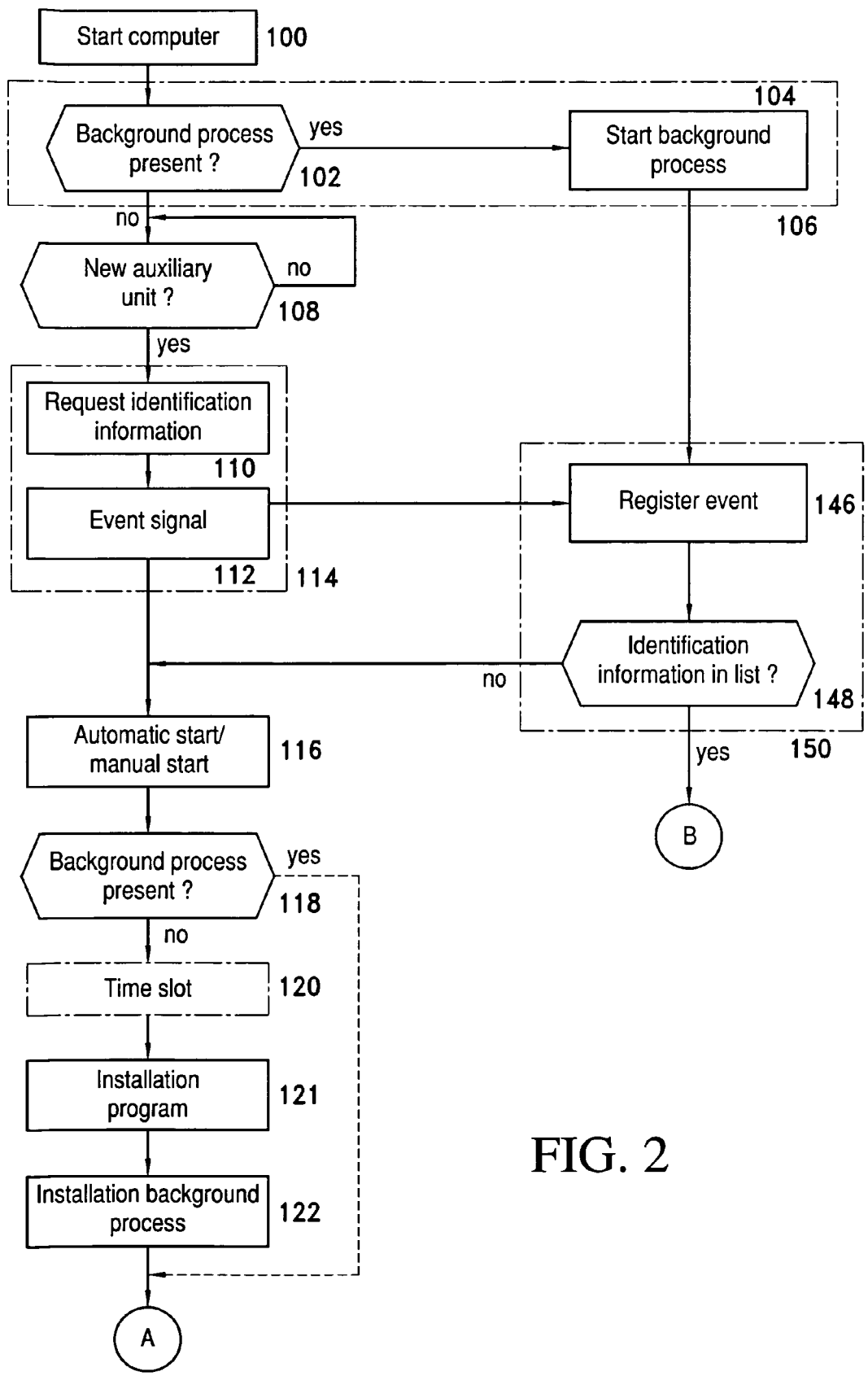
FIGS. 2 and 3 show a flow chart of the process of an installation of an auxiliary unit.
Figure 3:
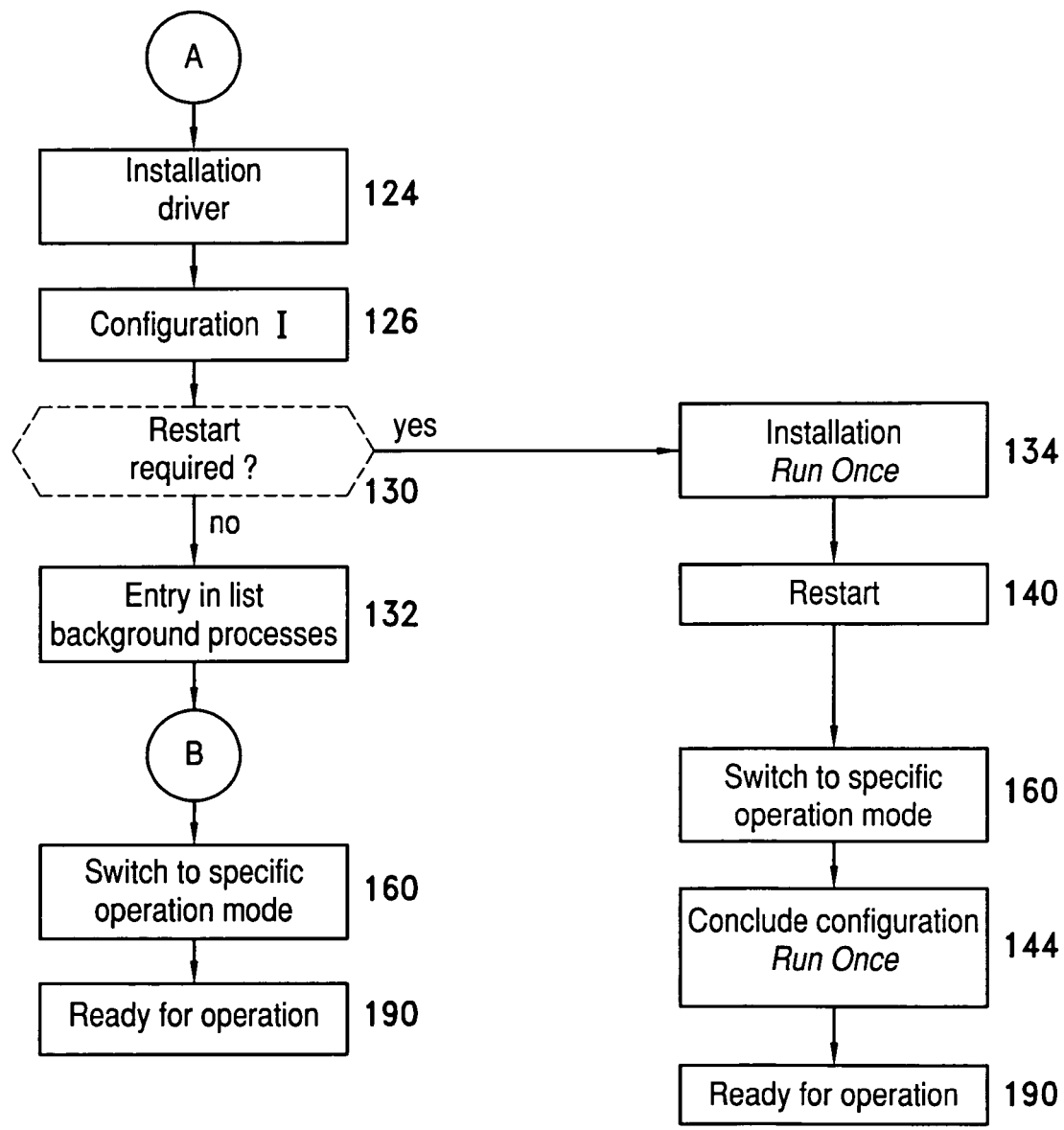

FIGS. 2 and 3 illustrate the process of launching an auxiliary unit 30 newly connected to a computer 10. It is assumed that the computer 10 runs under the operating system WINDOWS and the auxiliary unit 30 is a portable data carrier of the type of a chip card, wherein the interfaces 12 and 32 are implemented as USB interfaces.

The launching process starts with starting the computer 10, step 100. If present, also a background process 20 is started at the same time as the computer 10 is started, step 106. The start of the background process 20 can take place, as indicated in FIG. 2, in that the operating system 14 checks at a suitable point in time after the start of the computer 10 whether a background process 20 is present, step 102, and, if so, starts it subsequently, step 104.

Independent of whether a background process was started, the computer 10 is ready for connecting an auxiliary unit 30 after the start. This readiness is indicated in FIG. 2 by a wait loop 108, in which the computer 10 checks whether an auxiliary unit 30 was connected to the interface 12.

If a new auxiliary unit 30 is now connected to the interface 12, the standard identification 16 of the computer 10 will react. It determines the type of auxiliary unit 30 connected and assigns a type identification to it, under WINDOWS e. g. a drive character. On the side of the auxiliary unit 30 the basic mode is preset initially when connecting to the computer 10, and thus the emulator 36 is switched on. The emulator pretends that the auxiliary unit 30 is a standard unit, e. g. a standard mass memory unit. The operating system 14 identifies the auxiliary unit 30 correspondingly as a standard unit and registers it as a conventional standard unit with a corresponding type identification.

Furthermore the standard identification 16 induces the operating system 14 to execute an internal standard identification, step 114, which is carried out in two substeps 110, 112. In the first substep 110 the operating system 14 induces the auxiliary unit 30 to transmit a specific identification information 50—under WINDOWS for example the so-called volume ID—, and correlates it to the type identification as the name for the newly connected auxiliary unit 30. The operating system 22 stores the name in the list 22. Expediently the operating system 14 simultaneously requests further basic information together with the specific identification information, such as information on the exact designation of the auxiliary unit 30—such as producer and serial number—, on the technical properties—such as USB class or descriptors for describing a USB structure—, or routing information for executing the registration routine 18.

Once the identification information 50 and the basic information are received from the auxiliary unit 30, in the second substep 112 the computer 10 generates an event signal, which, if present, is recognized by the background process 20.

The further progress of the launching process depends on whether on the computer 10 a background process 20 is already present, rending the execution of a launching routine 28 possible, or not. In the following it shall be firstly assumed that such a background process 20 is not present.

In this case the standard identification 16 induces the operating system 14 to start executing the registration routine 18, step 116. The start takes place preferably automatically, if permitted by the setting of the operating system 14. In the case that the registration routine 18 is not executable directly through automatic start, the operating system 14 expects the execution of a manual start by a user.

Then the operating system 14 checks whether a background process 20 is given, step 118. For checking the reaction of a background process 20 a time slot may be provided. If this is the case, the operating system 14 checks in a step 120 whether the time slot was exceeded. If it is exceeded without any result, no background process 20 is present on the computer 10.

If a background process 20 is present, it can be expediently provided that step 148 is executed first and it is checked whether the identification information 50 is contained in the list 22, step 148. The intermediate step is recommendable in particular if the possibility is given that the registration routine 18 is started already before the evaluation of a possibly generated event signal in step 112. If the identification information is not contained in the list 22, the process is continued with step 124.

If it is determined that no background process is present, the registration routine 18 activates an installation program which has the effect that data provided on the auxiliary unit 30 are read out, transmitted to the computer 10 and installed there, in order to prepare the computer 10 for the auxiliary unit 30. The installation program is expediently disposed in the information file 31 that is specially provided for this purpose in the memory 46 of the auxiliary unit 30. From there it is read out by the registration routine 18, transmitted to the computer 10 and executed on the computer 10, step 121. Within the framework of its execution the installation program effects the transmission of a control signal to the auxiliary unit 30, triggering the transmission of the data to be installed.

Following the control signal the auxiliary unit 30 transmits from its memory 46 firstly the background process 20 stored therein to the computer 10. The background process is expediently installed on the computer 10 at once, step 122. Furthermore the auxiliary unit 30 following the control signal transmits from its memory 40 data for installing an auxiliary-unit specific operating routine in the memory 24 of the computer 10, step 124. Firstly, auxiliary-unit specific drivers are transmitted for this purpose, which are expediently installed directly on the computer 10 as well. Furthermore the auxiliary unit 30 transmits configuration settings 10 to the computer 10, step 126. These are also installed at once, as far as this is immediately possible.

Transmitting and installing the data to/on the computer 10 can be carried out expediently also in such a fashion that the installation program firstly transmits all data to the computer 10—and there copies them for example into a temporary directory. Subsequently the background process 20, the operating routines 40 and the configuration settings 10 are installed en bloc. In accordance with the distribution of tasks the installation program can consist of a starter component effecting the transmission of the data to the computer 10, and a configuration component called by the starter component, which carries out the installation of the transmitted data.

Expediently the installation program furthermore contains a check verifying whether a background process is present or not, which is carried out immediately after the start of the installation program. In the case that a background process is recognized, the registration routine 18 or the installation program are aborted.

Depending primarily on the type of auxiliary unit 30 and on the settings of the operating system 14 it can be necessary to restart the auxiliary unit 30 in order to conclude the configuration settings, in order to carry out steps for concluding the installation of drivers and configuration settings after restarting, which steps can only be taken after switching the auxiliary unit 30 to the auxiliary-unit specific operation mode. These steps are executed at a later point in time, as will be explained below.

In the case that a restart is not necessary, the operating system 14 enters the identification information 50 in the list 22 correlated to the background process 20, step 132. Subsequently the installation program effects the sending of a control signal to the auxiliary unit 30, which induces the operating system 34 of the latter to switch the mode switch 44 disposed on the auxiliary unit 30 to the auxiliary-unit specific operation mode, in which the function 42 specific for the auxiliary unit 30 is carried out, step 160. As control signal expediently a standard command valid in the basic mode can be used, with which the auxiliary unit 30 is logically disconnected from the computer 10. If the basic mode corresponds to a mass memory unit, as control signal for example the command EJECT or the SCSI command PREVENT_ALLOW_MEDIUM_REMOVAL come into question. Upon receipt of the control signal the auxiliary unit 30 concludes the basic mode and switches to the auxiliary-unit specific operation mode. Having been prepared correspondingly beforehand by the installation of auxiliary-unit specific drivers and configuration settings 10, the computer 10 now directly recognizes the auxiliary-unit specific operation mode.

Subsequently the system formed by the computer 10 and the auxiliary unit 30 is ready to carry out the function specific for the auxiliary unit 30, controlled by the operating routines now installed in the computer 10, step 190.

In the case that step 130 results in the necessity of a restart, the auxiliary unit 30 is restarted, step 140. The restart routine to be carried out subsequently is preferably designed in such a fashion that a restart is triggered only exactly once. For this purpose, expediently during the execution of the first part of the configuration in step 126, a special restart configuration (run-once configuration) is installed, step 134, which determines that the restart routine is executed exactly once.

The restart is triggered in that the installation program sends a control signal to the auxiliary unit 30, step 140, which signal effects the switching of the mode switch 44 of the auxiliary unit 20 to the auxiliary-unit specific operation mode, step 160.

In the following step 144 the operating system 14—in the auxiliary-unit specific operation mode—then concludes the configuration of the computer 10 in accordance with the specification by the run-once configuration. Therein it sets up such configuration settings which could not yet be carried out directly in step 126. After concluding the setup of the configuration settings the operating system 14 resets the run-once configuration.

The system formed by the computer 10 and the auxiliary unit 30 is ready for operation afterward, step 190.

In the case that the check in a step 150 carried out after a restart has the result that the identification information 50 is unknown to the background process 20, the latter induces the operating system 14 to start the execution of the registration routine 18 by carrying out the steps 116 et seq.

Below the case is explained in which a background process 20 is already present upon starting the computer 10 in step 100, or upon restarting the auxiliary unit 30 in step 140.

The event signal generated in step 112 is registered only by the background process 20 in this case, step 146. The background process 20 subsequently requests the identification information 50 obtained by the operating system 14 and checks whether the identification information 50 is contained in the list 22, step 148.

If this is the case, the background process 20 directly carries out step 160 and induces the operating system 14—by emitting a control signal, as described above—to contact the mode switch 44 of the auxiliary unit 30, to switch the auxiliary unit 30 to the auxiliary-unit specific operation mode. Subsequently the auxiliary unit 30 is directly ready for operation, step 190.

If the check in step 150 has the result that the identification information 50 transmitted by the auxiliary unit 30 is not contained in the list 22, the background process 20 induces the operating system 14 to start the registration routine 18 and to carry out the steps 116 et seq.

Figure 4:
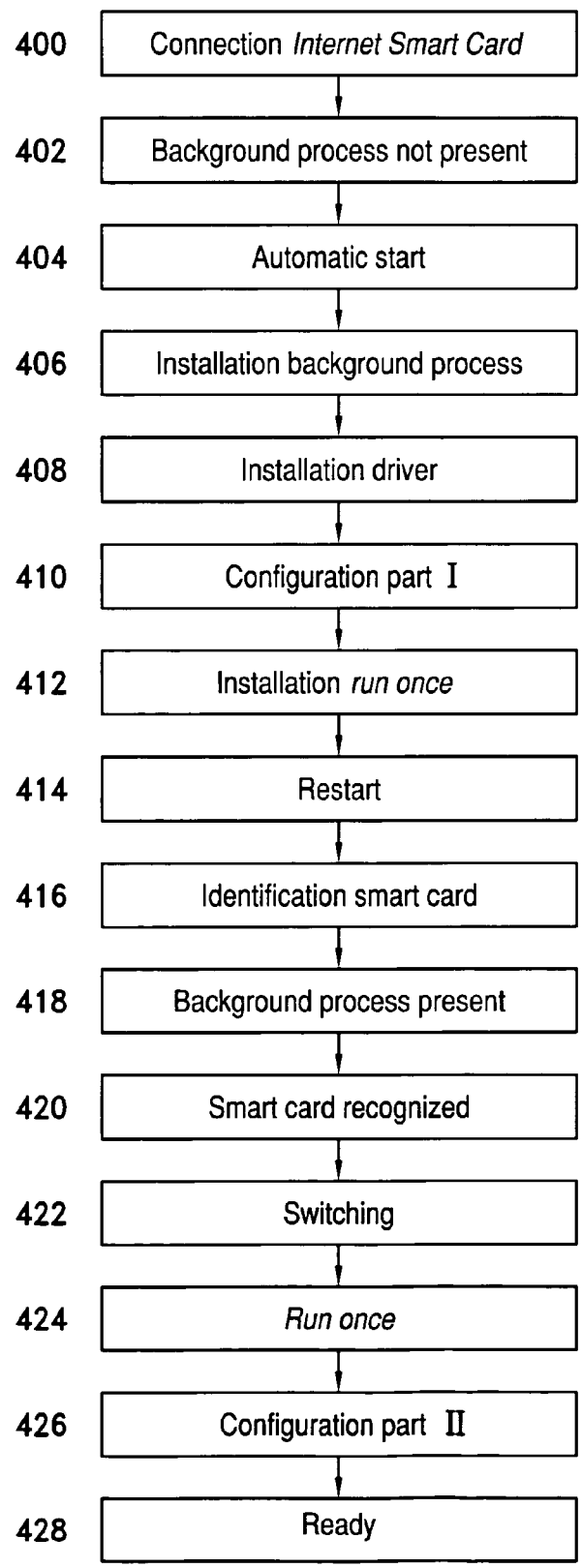
FIG. 4 to 6 show the process of subsequent launches of different auxiliary units on a computer.
Figure 5:
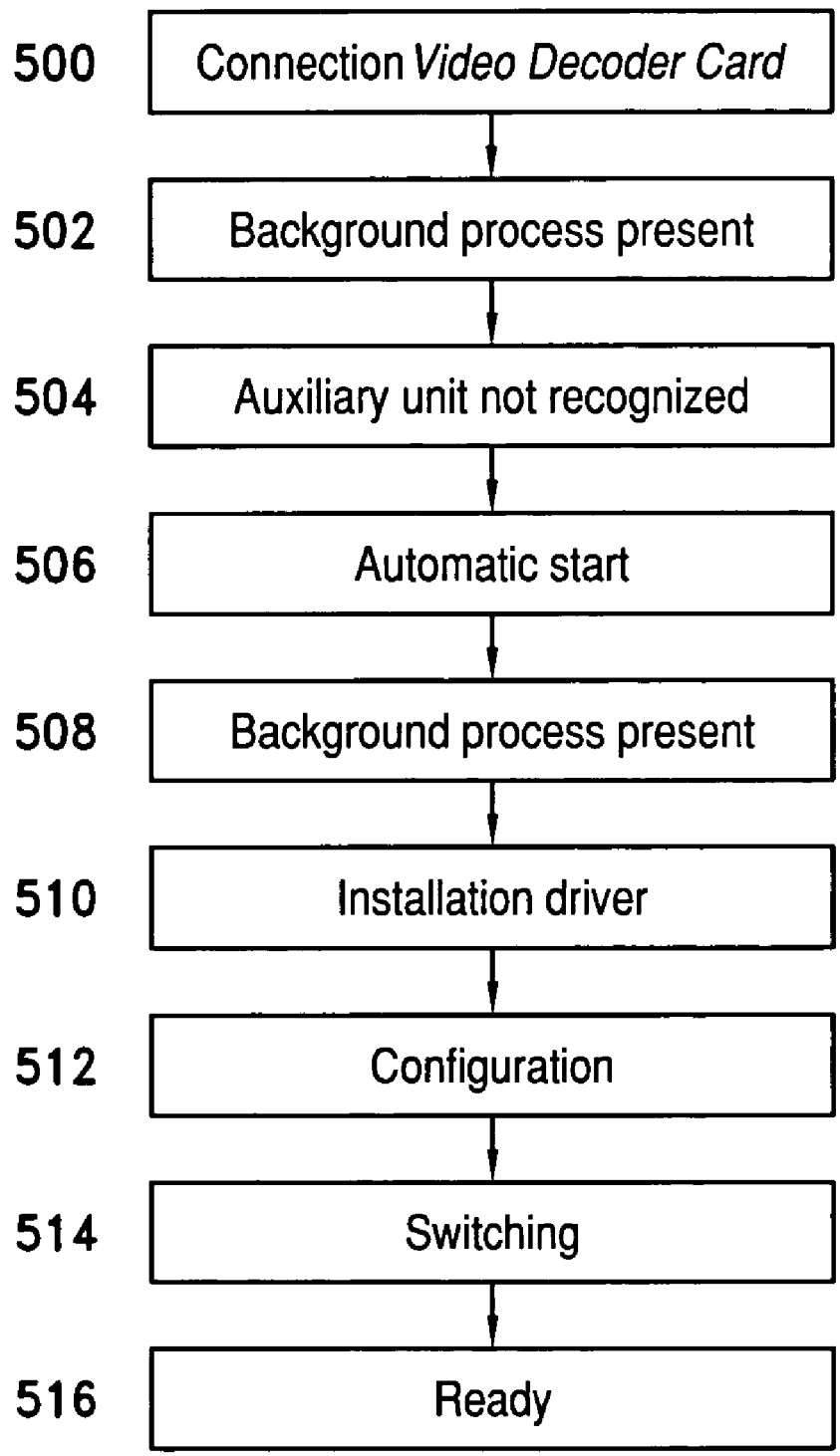
Figure 6:
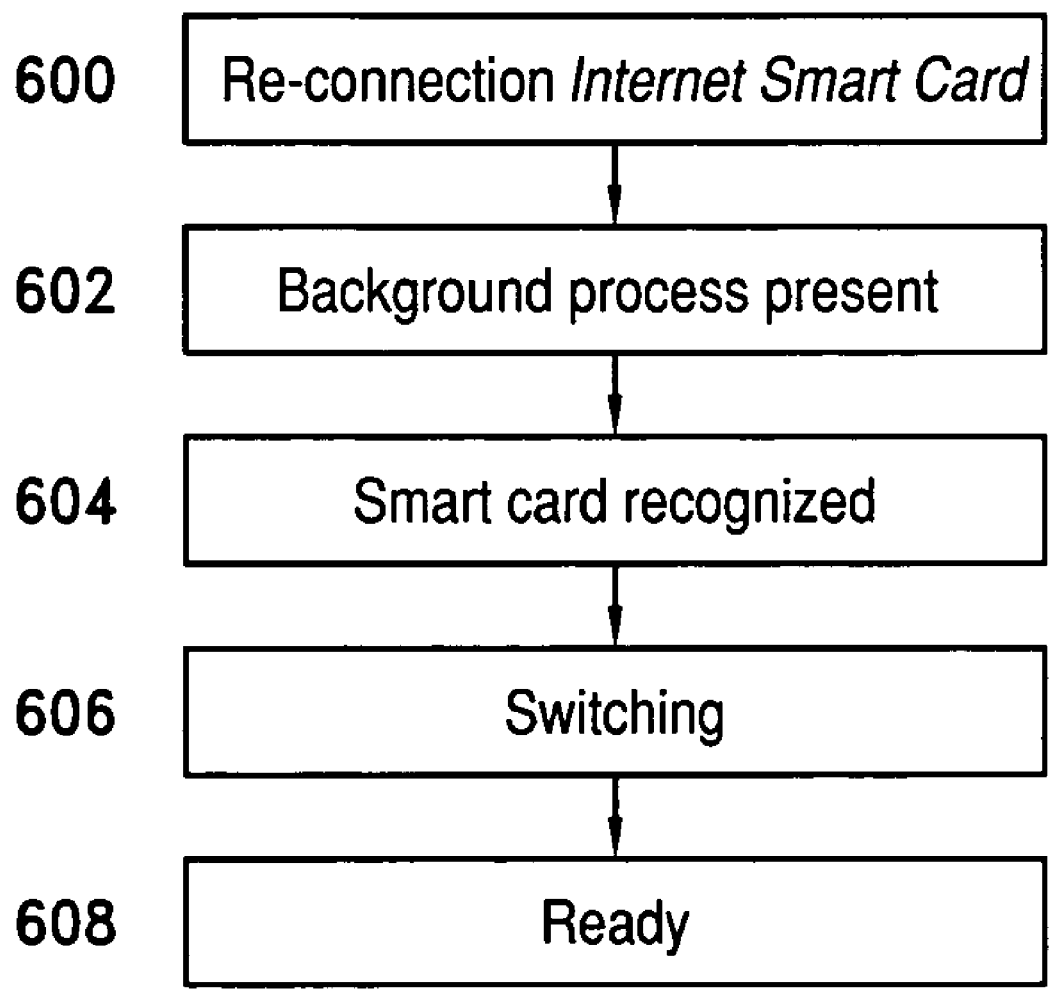

FIGS. 4 to 6 show exemplary processes for subsequent launches of different auxiliary units 30 on a computer 10. In the process shown in FIG. 4 it is assumed that as auxiliary unit 30 a chip card acting as internet server (internet smart card) is connected, upon whose first-time connection a restart of the computer 10 is required. The computer 10 is furthermore prepared for the automatic start of a registration routine 18 and a background process 20 is not yet present.

The process starts with the connection of the internet smart card 30 to the computer 10, step 400. Upon recognizing the connection the operating system 14 of the computer 10 determines that a background process 20 is not present, step 402; therefore the execution of the registration routine 18 is started automatically, step 404. Thereby the required drivers are installed from the internet smart card 30, step 408, the configuration settings are set up as far as possible, step 410, and a run-once configuration is installed, step 412. Afterward the auxiliary unit 30 is restated, step 414. The restart is carried out by sending a control signal triggering the switching of the auxiliary unit 30 to the auxiliary-unit specific operation mode, step 422.

Alternatively a restart can also be carried out by temporarily physically disconnecting the auxiliary unit 30 from the computer 10. In this case the operating system 14 again recognizes the connection of an auxiliary unit 30 and determines that a background process 20 is now present, step 418. The latter now recognizes the auxiliary unit 30 as the internet smart card 30, step 420, whereupon the operating system triggers the switching of the internet smart card 30 to its auxiliary-unit specific operation mode, step 422.

After switching to the auxiliary-unit specific mode the operating system 14 reads out the configuration settings in accordance with the run-once configuration, step 424, and concludes the configuration, step 426. Subsequently the computer 10 and the auxiliary unit 30 are ready for operation.

FIG. 5 shows the launching process if a decoding chip card (video decoder card), such as e. g. used in pay-TV receivers, is for the first time connected to the computer 10 subsequently as auxiliary unit 30. The connection of the video decoder card 30 does not require a restart.

The process again starts with the connection of the video decoder card 30 to the computer 10, step 500. Its operating system 14 now recognizes upon detecting the connection that a background process 20 is already present, step 502. However, the background process 20 cannot recognize the video decoder card connected as auxiliary unit 30, since its identification information 50 is not contained in the list 22, step 504. Therefore the registration routine 18 is automatically started, step 506. The latter recognizes that a background process 20 is present, step 508, installs the required drivers from the video decoder card, step 510, and sets up the configuration settings provided by the video decoder card 30, step 512. Subsequently the operating system 14 triggers the switching of the video decoder card 30 to its specific mode, thus concluding the launch and rendering the video decoder card 30 ready for operation, step 516.

FIG. 6 shows the launching process if the internet smart card according to FIG. 4 is again connected to the computer 10 subsequent to the video decoder card.

The process again starts with the connection of the internet smart card 30 to the computer 10, step 600. Its operating system 14 now recognizes upon detecting the connection that a background process 20 is already present, step 602, which also recognizes the auxiliary unit 30 as the internet smart card 30, step 604. The operating system 14 therefore directly triggers the switching of the internet smart card 30 to its specific operating mode, step 606, thus rendering the internet smart card 30 ready for operation, step 608.

Within the framework of the basic approach of establishing a consistent master-slave arrangement for an auxiliary unit 30 to be connected to a computer 10, which auxiliary unit requires the provision of certain required operating routines, by installing a background process 20 provided if required by the auxiliary unit 30 on the computer 10, which background process subsequently permits a fast launch of the auxiliary unit 30 by recognizing and switching to the auxiliary-unit specific operation mode, a plurality of embodiments both of the method and of the underlying arrangement are possible. Thus method steps can be added without any problem, e. g. for loading and installing further expedient functions, optional program steps, such as a restart, can be carried out obligatorily, method steps, such as checking whether a time-slot is exceeded, can be omitted, or method steps can be summed up, such as the registration of a connection of a new auxiliary unit and the recognition of its identification. Since they primarily serve to visualize principles, the representations in the figures are in no way to be interpreted as strictly binding. The success of the invention can be achieved also if the representations of the figures are departed from. Modifications can of course become necessary, if the method is to be employed in computers 10 with operating systems having a different structure than the operating system WINDOWS taken as a basis here. Furthermore the computer 10 and the auxiliary unit 30 can be configured in many ways.

The invention claimed is:

1. A method for installing an auxiliary unit on a computer having an interface suitable for connecting the auxiliary unit, which computer is prepared to carry out a registration routine, comprising:

upon detecting the connection of a new auxiliary unit to the interface, within the registration routine, the installation of an operating routine required for operating the new auxiliary unit is carried out, if the operating routine is not yet present in the computer; and after the installation of the operating routine, the new auxiliary unit is switchable from a basic mode to an auxiliary-unit specific mode by a background process, wherein to install the operating routine data for installing the operating routine is first transmitted from the new auxiliary unit to the computer, wherein, for determining whether the required operating routine has to be transmitted, on the computer the background process is installed, which upon connecting an auxiliary unit sends a request for identification information and checks whether identification information transmitted back by the auxiliary unit upon request by the background process is already stored in a list in the computer.

2. The method according to claim 1, wherein the background process is transmitted by the auxiliary unit to the computer, if the computer detects no activity by a background process after receipt of identification information from the auxiliary unit.

3. The method according to claim 2, wherein, the computer is checked to determine whether a background process is present and having detected the absence of a background process on the computer, the computer requests the transmission of the background process by the auxiliary unit through a control signal.

4. The method according to claim 1, wherein upon detecting a new auxiliary unit the computer provides an event signal which is recognized by the background process.

5. The method according to claim 1, wherein the auxiliary unit is switched to the auxiliary-unit specific operation mode by the background process, if the identification information is contained in the list.

6. The method according to claim 5, wherein the switching is triggered by the background process, in that the background process sends a control signal to the auxiliary unit which disconnects the auxiliary unit from the computer.

7. The method according to claim 1, wherein loading and installing of a required operating routine on the computer is induced, if the background process cannot allocate an identification information.

8. The method according to claim 1, wherein, upon detecting the connection of a new auxiliary unit a request is sent to the new auxiliary unit to transmit basic information on an exact designation of the new auxiliary unit, on logical structure and properties of the new auxiliary unit, on either or both functions of the new auxiliary unit and standard data including routing information for carrying out a registration routine to the computer.

9. A method for installing an auxiliary unit on a computer having an interface suitable for connecting the auxiliary unit, which computer is prepared to carry out a registration routine, comprising:

upon detecting the connection of a new auxiliary unit to the interface, within the registration routine the installation of an operating routine required for operating the new auxiliary unit is carried out, if the operating routine is not yet present in the computer; and after the installation of the operating routine, the new auxiliary unit is switchable from a basic mode to an auxiliary-unit specific mode by a background process, wherein to install the operating routine data for installing the operating routine is first transmitted from the new auxiliary unit to the computer, wherein, upon connecting an auxiliary unit, first an installation program is transmitted by the auxiliary unit to the computer and executed on the computer, wherein the installation program in turn subsequently reads out the required operating routine from the auxiliary unit and installs it on the computer.

10. The method according to claim 9, wherein after installing the operating routine the installation program triggers the emission of a control signal to the auxiliary unit, which disconnects the auxiliary unit from the computer.

11. The method according to claim 9, wherein the transmission of the installation program is induced by the registration routine upon the connection of an auxiliary unit.

12. A portable data carrier for carrying out a method according to claim 1, comprising an operating system arranged to carry out a function that this specific for the portable data carrier, and an emulator adapted to pretending towards a computer that the portable data carrier is a mass memory unit, wherein in a memory a background process is stored, which after transmission to and installation on a computer effects the recognition of the portable data carrier.

13. The portable data carrier according to claim 12, configured as a chip card with a USB interface.

14. A portable data carrier for carrying out a method according to claim 9, comprising an operating system arranged to carry out a function that this specific for the portable data carrier, and an emulator adapted to pretending towards a computer that the portable data carrier is a mass memory unit, wherein, in a memory an installation program is stored, which after transmission to and installation on a computer reads out a required operating routine from the auxiliary unit and installs it on the computer.

* * * * *